US010833560B1

(12) United States Patent  
Hauser et al.

(10) Patent No.: US 10,833,560 B1  
(45) Date of Patent: Nov. 10, 2020

(54) COMBINATION ELECTRIC GENERATOR WITH ELECTRIC CLUTCH

(71) Applicant: Hydro-Gear Limited Partnership, Sullivan, IL (US)

(72) Inventors: Raymond Hauser, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 245 days.

(21) Appl. No.: 15/864,547

(22) Filed: Jan. 8, 2018

Related U.S. Application Data

(63) Continuation of application No. 14/867,911, filed on Sep. 28, 2015, now Pat. No. 9,866,088.

(60) Provisional application No. 62/058,577, filed on Oct. 1, 2014, provisional application No. 62/056,134, filed on Sep. 26, 2014.

(51) Int. Cl.
| | |
|---|---|
| *H02K 7/114* | (2006.01) |
| *H02K 5/04* | (2006.01) |
| *H02K 16/02* | (2006.01) |
| *H02K 7/00* | (2006.01) |
| *B60L 50/15* | (2019.01) |

(52) U.S. Cl.  
CPC ............ *H02K 7/114* (2013.01); *B60L 50/15* (2019.02); *H02K 5/04* (2013.01); *H02K 7/003* (2013.01); *H02K 16/02* (2013.01)

(58) Field of Classification Search  
CPC . H02K 7/11; H02K 7/114; H02K 7/12; H02K 49/00–12; H02K 5/00–26  
USPC .... 310/76, 77, 78, 102 R, 102 A, 92, 93, 89  
See application file for complete search history.

(56) References Cited

U.S. PATENT DOCUMENTS

| | | | |
|---|---|---|---|
| 1,129,777 | A | 2/1915 | Apple |
| 1,307,230 | A | 6/1919 | Von Zweigbergk et al. |
| 1,758,533 | A | 5/1930 | Porsche |
| 2,151,487 | A | 3/1939 | Schaeren |
| 2,408,808 | A | 10/1946 | Stout |
| 3,317,765 | A | 5/1967 | Cone |
| 3,367,438 | A | 2/1968 | Moore |

(Continued)

FOREIGN PATENT DOCUMENTS

| | | |
|---|---|---|
| EP | 1112884 | 9/2003 |
| JP | 2001057710 | 2/2001 |

(Continued)

OTHER PUBLICATIONS

"Housing, n. 1." OED Online. Oxford University Press, Mar. 2020. Web. Mar. 8, 2020. (Year: 2020).*

(Continued)

*Primary Examiner* — Thomas Truong  
(74) *Attorney, Agent, or Firm* — Neal, Gerber & Eisenberg LLP

(57) ABSTRACT

A generator and clutch assembly is disclosed for use in a vehicle and includes a rotatable input, an electric generator in a generator housing, a clutch rotor by driven by the rotatable input, and an electric clutch and brake assembly which may be integrated with the generator housing. A field coil may be mounted to an external surface of the generator housing. The generator and clutch may be offset and connected by means of a transfer system having a transfer housing, wherein a field coil is mounted to an external surface of the transfer housing.

16 Claims, 6 Drawing Sheets

(56) References Cited

U.S. PATENT DOCUMENTS

| | | | |
|---|---|---|---|
| 3,589,485 A | 6/1971 | Kajitani et al. | |
| 3,778,651 A | 12/1973 | Cone | |
| 4,010,377 A | 3/1977 | McKenzie | |
| 4,309,620 A | 1/1982 | Bock | |
| 4,712,660 A | 12/1987 | Erndt et al. | |
| 4,720,638 A | 1/1988 | Vollbrecht | |
| 4,823,926 A | 4/1989 | Wittler et al. | |
| 4,862,009 A | 8/1989 | King | |
| 5,125,236 A | 6/1992 | Clancey et al. | |
| 5,126,582 A | 6/1992 | Sugiyama | |
| 5,209,085 A | 5/1993 | Brien | |
| 5,258,651 A | 11/1993 | Sherman | |
| 5,523,636 A | 6/1996 | Nelson | |
| 5,529,157 A | 6/1996 | Desrochers | |
| 5,773,904 A | 6/1998 | Schiebold et al. | |
| 5,971,121 A * | 10/1999 | Pardee | F16D 55/02 192/12 D |
| 6,184,603 B1 | 2/2001 | Hamai et al. | |
| 6,281,646 B1 | 8/2001 | Grundl et al. | |
| 6,306,057 B1 * | 10/2001 | Morisawa | B60K 6/365 475/5 |
| 6,333,577 B1 | 12/2001 | Kusumoto et al. | |
| 6,359,344 B1 | 3/2002 | Klein et al. | |
| 6,365,983 B1 | 4/2002 | Grundl et al. | |
| 6,388,348 B2 | 5/2002 | van Heyden et al. | |
| 6,547,527 B2 | 4/2003 | Gaither | |
| 6,585,066 B1 | 7/2003 | Koneda et al. | |
| 6,604,348 B2 | 8/2003 | Hunt | |
| 6,734,647 B2 | 5/2004 | Wakitani et al. | |
| 6,675,562 B2 | 7/2004 | Lawrence | |
| 6,987,328 B2 | 1/2006 | Osborne | |
| 7,114,585 B2 | 10/2006 | Man et al. | |
| 7,163,072 B2 | 1/2007 | Yamaguchi | |
| 7,240,751 B2 | 7/2007 | Hoare et al. | |
| 7,264,069 B2 | 9/2007 | Fiorenza et al. | |
| 7,311,184 B2 | 12/2007 | Patridge | |
| 7,867,124 B2 | 1/2011 | Conlon et al. | |
| 7,972,237 B2 | 7/2011 | Ota | |
| 8,047,314 B2 | 11/2011 | Oba et al. | |
| 8,100,207 B2 | 1/2012 | Oba et al. | |
| 8,192,324 B2 | 6/2012 | Kraska et al. | |
| 8,210,290 B2 | 7/2012 | Simon et al. | |
| 8,337,359 B2 | 12/2012 | Hofbauer | |
| 8,393,236 B1 | 3/2013 | Hauser et al. | |
| 8,615,976 B1 * | 12/2013 | Hauser | H02K 7/1025 310/89 |
| 8,771,138 B2 | 7/2014 | Van Batavia et al. | |
| 8,812,185 B2 | 8/2014 | Amano et al. | |
| 8,812,204 B2 | 8/2014 | Kawaguchi et al. | |
| 9,139,075 B2 | 9/2015 | Glassner et al. | |
| 2004/0108781 A1 * | 6/2004 | Razzell | H02K 7/11 310/112 |
| 2004/0145252 A1 * | 7/2004 | Arimitsu | B60K 6/445 310/58 |
| 2009/0000896 A1 | 1/2009 | Knowles | |
| 2010/0025131 A1 | 2/2010 | Gloceri et al. | |
| 2012/0083173 A1 | 4/2012 | McMillan | |
| 2013/0213182 A1 | 8/2013 | Vogel et al. | |
| 2014/0013722 A1 | 1/2014 | Pitcel et al. | |
| 2014/0197716 A1 | 7/2014 | Shiina et al. | |
| 2014/0216399 A1 | 8/2014 | Smith et al. | |
| 2014/0216841 A1 | 8/2014 | Winter et al. | |
| 2014/0315682 A1 | 10/2014 | Helmer et al. | |

FOREIGN PATENT DOCUMENTS

| | | |
|---|---|---|
| JP | 2005161971 | 6/2005 |
| WO | WO2006044624 | 4/2006 |

OTHER PUBLICATIONS

Kim, et al., "Comparison of Powertrain Configuration Options for Plug-in HEVs from a Fuel Economy Perspective," SAE International, 2012.

Mathias, et al., "A Full Hybrid Vehicle with Parallel Hybrid Powertrain and Electric Clutch," Retrieved from web page <http://bioage.typepad.com/greencarcongress/docs/siemenshybridpaper.pdf> on Nov. 13, 2015.

Ogura Industrial Corp., "Electromagnetic Clutches & Brakes," Retrieved from <www.ogura-clutch.com/products.html?cateogry=1&product=9> on Sep. 18, 2014.

Reik, et al., "World of Hybrids—A Difficult Choice," LuK Symposium, 2006.

Warner Electric brochure, "Clutch/Brakes for Lawn and Garden Equipment," Mar. 2011.

* cited by examiner

COMBINATION ELECTRIC GENERATOR WITH ELECTRIC CLUTCH

CROSS-REFERENCE

This application is a continuation of U.S. patent application Ser. No. 14/867,911, filed on Sep. 28, 2015, which claims the benefit of U.S. Provisional Patent App. No. 62/058,577, filed on Oct. 1, 2014, and U.S. Provisional Patent App. No. 62/056,134, filed on Sep. 26, 2014. All of these prior applications are incorporated herein by reference in their entirety.

BACKGROUND OF THE INVENTION

This invention relates to a combination of an electric generator and an electric clutch for use in a drive system that may be used in vehicles such as lawn and garden tractors, stand-on mowers, walk-behind snow throwers and mowers, and the like.

SUMMARY OF THE INVENTION

The invention comprises a combination of an electric generator and an electric clutch. In one embodiment disclosed herein, the electric clutch is integrated with the bottom housing member of the generator housing, such that the generator and clutch are located adjacent to one another in a low-profile configuration. A field coil of the electric clutch is mounted on an external surface of the generator housing, reducing the height of the overall unit. In a further embodiment, the generator and clutch are in a side-by-side relationship and a field coil of the electric clutch is mounted to an external surface of an extension of the generator housing, which also serves as a portion of a housing for a belt drive system to connect the generator and clutch to a common input from the prime mover, thus also providing a low-profile configuration. The combination generator and clutch taught herein may be used in connection with a vehicle, wherein both the electric clutch and other apparatuses on the vehicle are powered by the generator.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
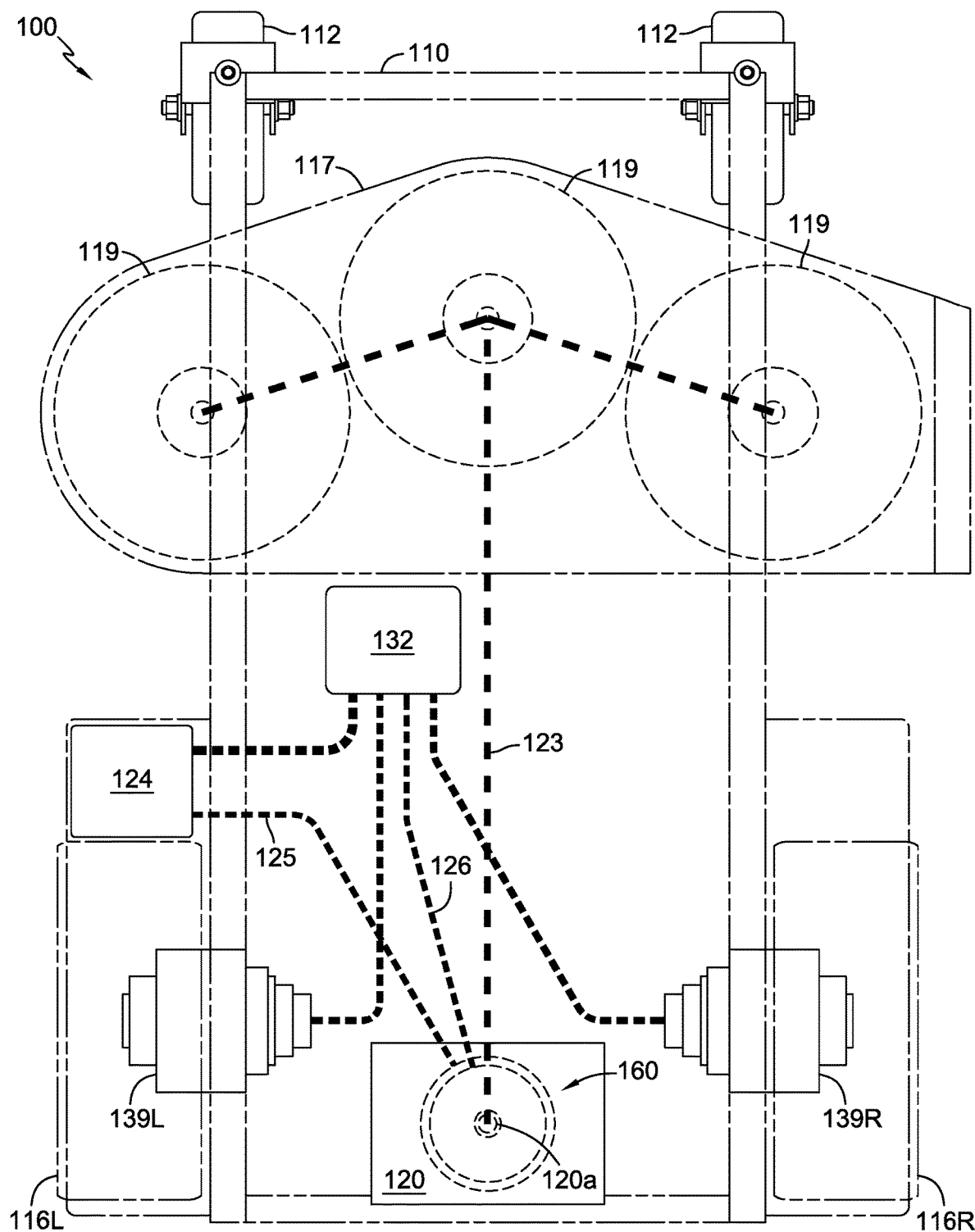
FIG. 1 is a partially schematic drawing of an exemplary vehicle incorporating a combination electric generator and clutch assembly.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIG. 1 illustrates a riding vehicle 100 including a pair of electric wheel motors 139L, 139R to power a pair of driven wheels 116L, 116R. A set of caster wheels 112 is disposed at the front of frame 110, which also supports a mowing deck 117 having a plurality of mowing blades 119. A prime mover 120, which may be an internal combustion engine, is also disposed on frame 110 near the rear thereof. It will be understood that operator input controls and an operating seat or platform for the operator of the vehicles disclosed herein would be provided as well. In this embodiment, vehicle 100 includes a belt and pulley system 123 that connects the output shaft 120a of prime mover 120 with mowing blades 119 via generator clutch brake assembly 160; the connecting belt and pulley system 123 can be of a standard form and is not critical to this invention.

Vehicle 100 also includes a controller 132 supported by frame 110 and operatively connected to battery 124 and to wheel motors 139L, 139R. As will be described below, controller 132 also supplies power to electric clutch-brake assembly 162 via conductor 126.

Figure 2:
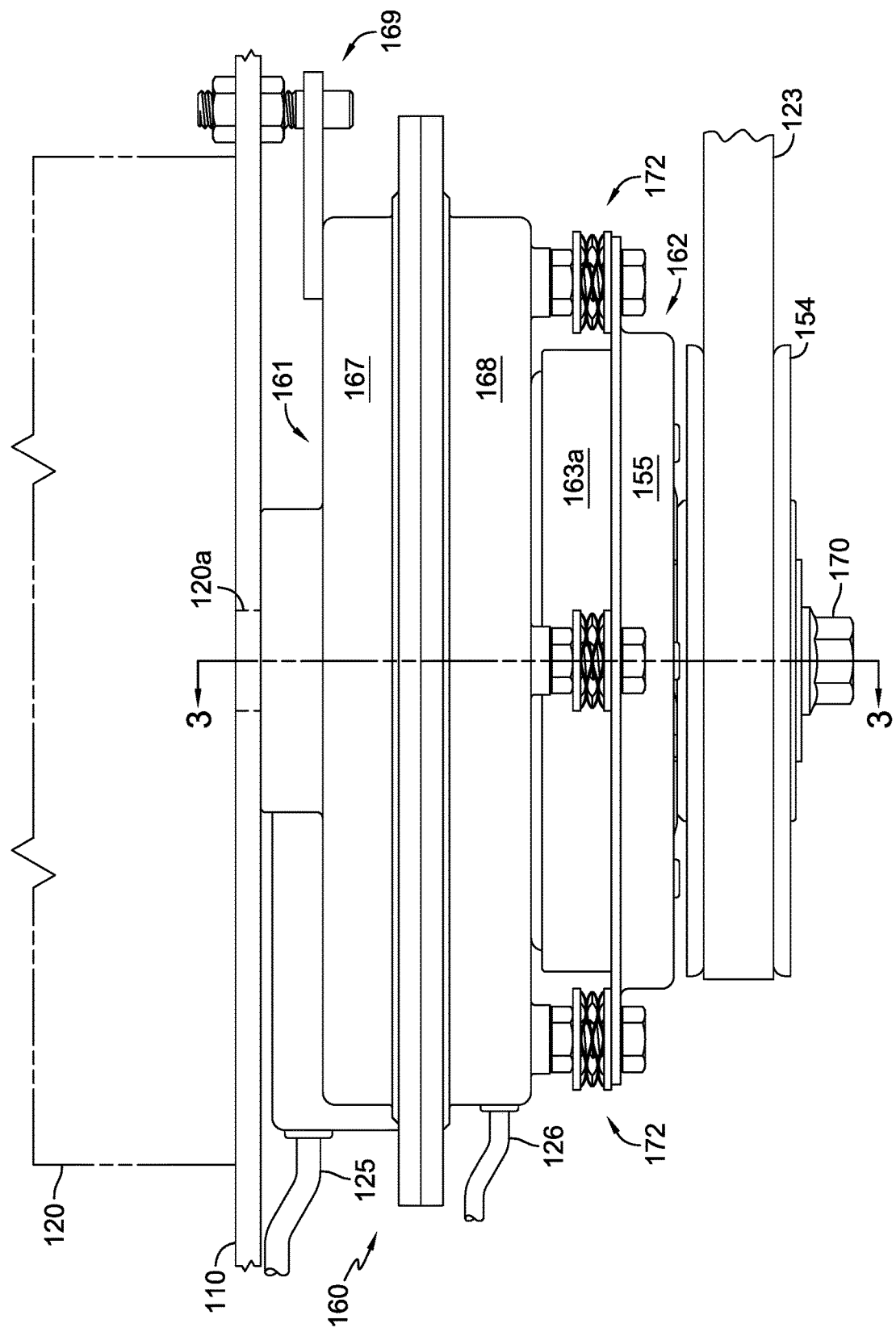
FIG. 2 is a side elevational view of a combination electric generator and clutch assembly.
Figure 3:
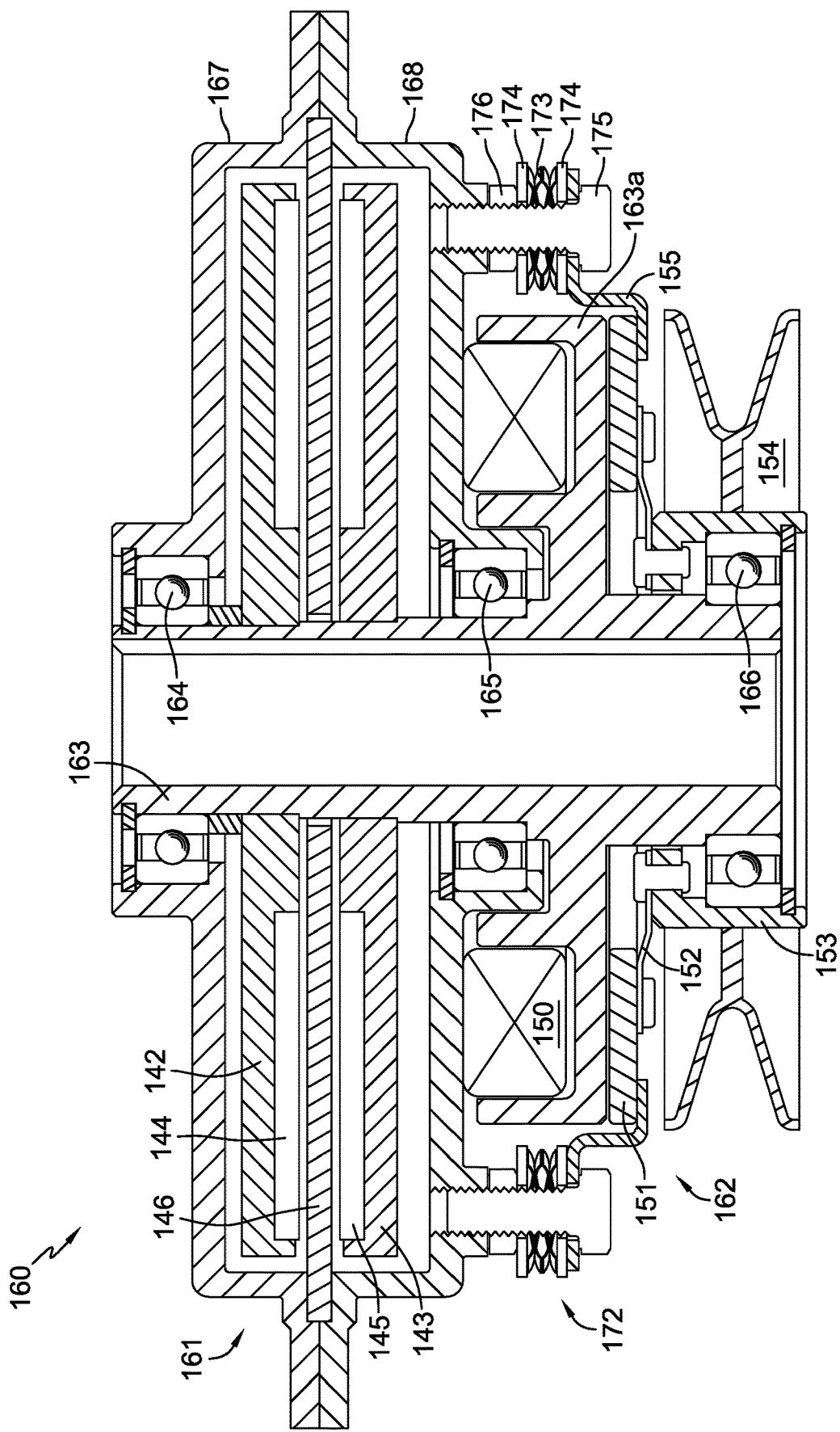
FIG. 3 is a cross sectional view of the combination electric generator and clutch assembly of FIG. 2 along line 3-3 in FIG. 2.

Generator clutch brake assembly 160 is shown in FIGS. 2 and 3, where it can be seen to include a generator 161 having upper housing member 167 and lower housing member 168 forming a single generator housing. A rotatable member, namely input tube 163, extends through generator 161 and is supported in part by upper bearing 164 in upper housing member 167 and by intermediate bearing 165 in lower housing member 168. A lower bearing 166 is located in output hub 153 to support rotation of output hub 153 and pulley 154 when the clutch is engaged. It is preferred that each of the bearings 164, 165, 166 be sealed bearings to eliminate the need for additional seals, thereby further reducing the height of the overall unit.

Input tube 163 also comprises clutch rotor 163a formed therewith, and it will be understood that the output shaft 120a of prime mover 120 extends into the input tube 163 and is connected thereto by known means, including fastener 170 so that input tube 163 rotates with the prime mover output shaft 120a. It will be understood that other rotatable input means can be used to connect with an output shaft of the prime mover and transfer the rotational movement as outlined herein, in place of the disclosed input tubes.

Generator 161 comprises a stator 146 fixed within housing members 167 and 168 and incorporating coil windings formed in stator 146 in a known manner. Magnets 144 and 145 are fixed on upper rotor 142 and lower rotor 143, respectively, to rotate adjacent stator 146 and generate an electric current in a known manner. The output of generator 161 is provided to battery 124 by means of conductor 125, as shown in FIGS. 1 and 2. At least one anti-rotation device 169 is provided to prevent rotation of generator clutch brake assembly 160.

To simplify construction and operation, an electric clutch-brake assembly 162 is used in combination with generator 161 to selectively connect output hub 153 and pulley 154 to input tube 163. A field coil 150 is fixed to an external surface of lower housing member 168 of generator 161 by known methods, such as adhesives. This arrangement helps to reduce the overall height of the assembly 160, conserving ground clearance in utility vehicles such as riding vehicle 100. Field coil 150 is powered by conductor 126 connected to controller 132. Clutch-brake disk 151 is fixed to output hub 153 by means of a plurality of leaf springs 152 and engages the inner surface of brake shroud 155, as shown in FIG. 3, to provide a braking force to output hub 153. Clutch-brake disk 151 is biased to this braking position by means of the plurality of leaf springs 152. When field coil 150 is energized, clutch-brake disk 151 is magnetically pulled to engage clutch rotor 163a, thereby engaging the output hub 153 and pulley 154 with input tube 163 to provide rotational output thereto. It will be understood that frictional material will be used on the various components as needed.

As shown in FIGS. 2 and 3, brake shroud 155 is secured to the lower housing member 168 by a plurality of adjustment mechanisms 172. Gap adjustment mechanisms 172 permit the distance between clutch-brake disk 151 and clutch rotor 163a to be set and adjusted as needed. Each gap adjustment mechanism 172 comprises a wave spring 173 secured between a pair of washers 174, and between the locknut 176 and the head of screw 175. Thus, the gap adjustment mechanisms 172 act both to retain the brake shroud 155 and permit necessary adjustments, e.g., as clutch-brake disk 151 wears.

Figure 4:
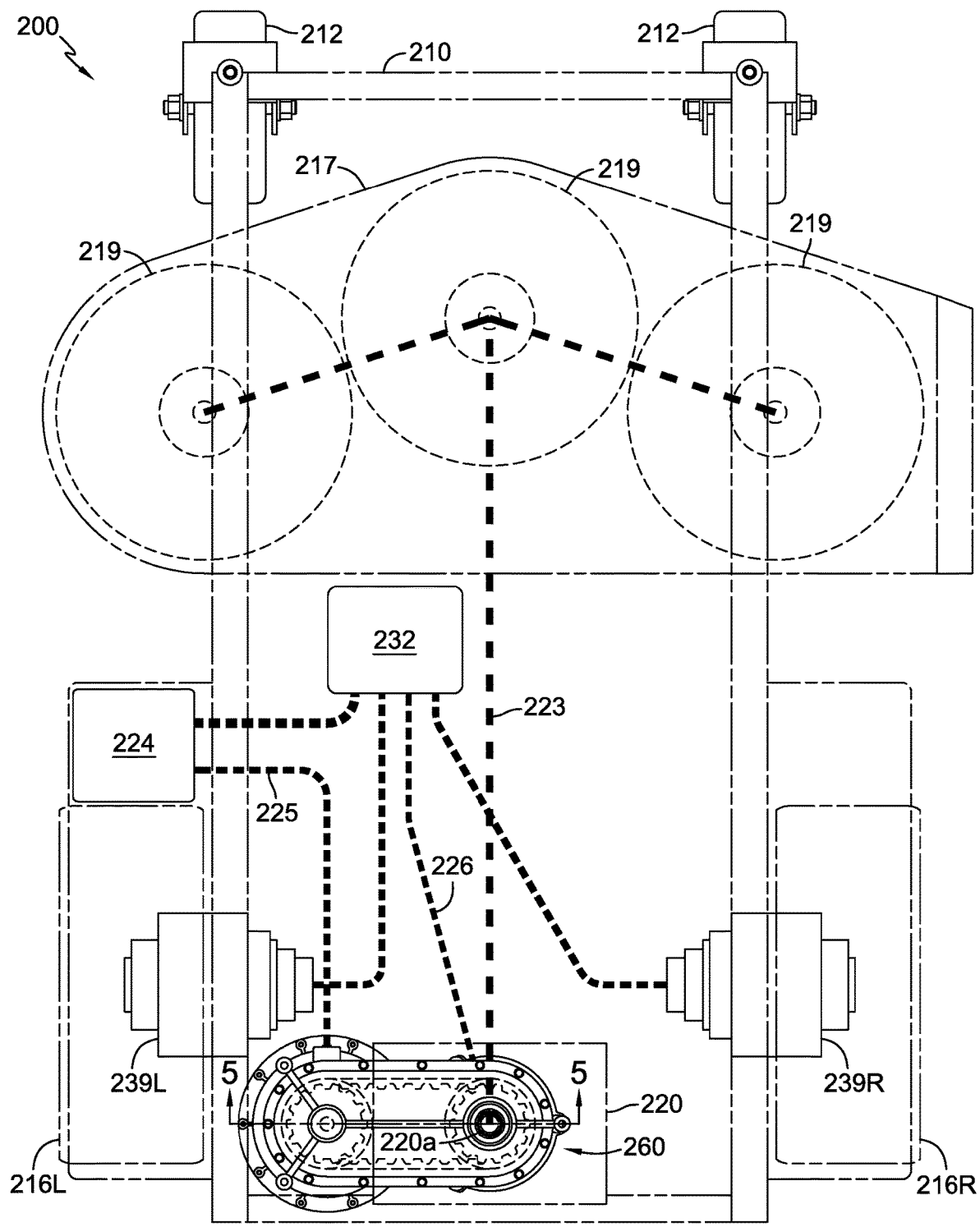
FIG. 4 is a partially schematic drawing of an exemplary vehicle incorporating a second embodiment of a combination electric generator and clutch assembly.
Figure 5:
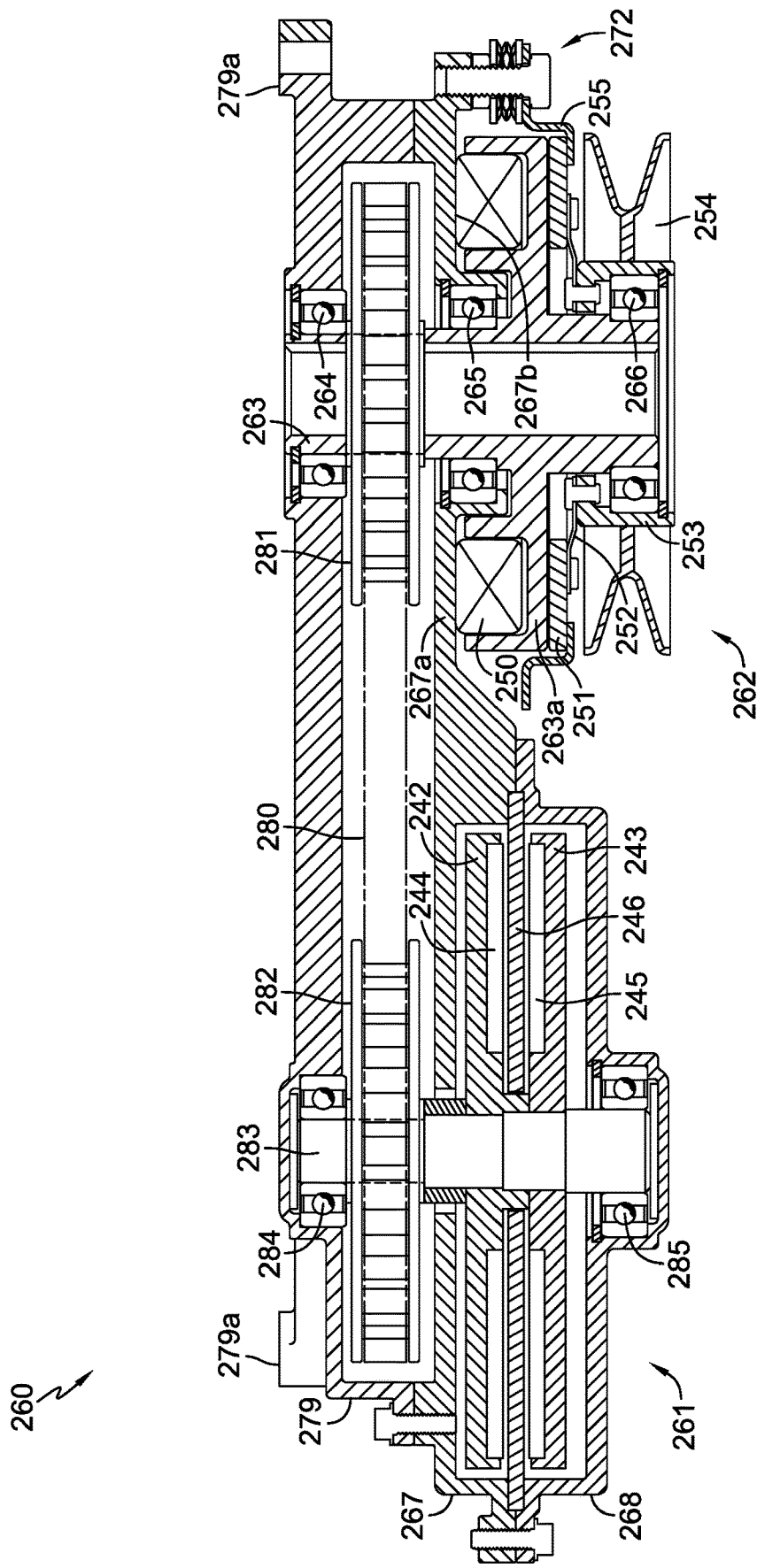
FIG. 5 is a cross sectional view of the combination electric generator and clutch assembly of FIG. 4 along the line 5-5 in FIG. 4.

A second embodiment of a combination electric clutch-brake and generator is shown in FIGS. 4 and 5, where generator 261 and clutch-brake assembly 262 are in a side-by-side relationship. FIG. 4 illustrates a riding vehicle 200 including a pair of electric wheel motors 239L, 239R to power a pair of driven wheels 216L, 216R. A set of caster wheels 212 is disposed at the front of frame 210, which also supports a mowing deck 217 having a plurality of mowing blades 219. Prime mover 220, which may be an internal combustion engine, is also disposed on frame 210 near the rear thereof. In this second embodiment, vehicle 200 includes a standard belt and pulley system 223 that connects the output shaft 220a of prime mover 220 with mowing blades 219 via clutch-brake assembly 262. Controller 232 is operatively connected to battery 224 and to wheel motors 239L, 239R, and also supplies power to electric clutch-brake assembly 262 via conductor 226. Generator 261 is connected to battery 224 by means of conductor 225.

Generator 261 is disposed in a housing comprising upper generator housing member 267 and lower generator housing member 268. As will be described in more detail below, upper generator housing member 267 includes a flange or extension 267a. The shape of upper generator housing member 267 and its ability to serve multiple functions in this design help to minimize parts and reduce size of the overall unit. A stator 246 is fixed between upper generator housing member 267 and lower generator housing member 268 and incorporates coil windings formed in stator 246 in a known manner. Magnets 244 and 245 are fixed on upper rotor 242 and lower rotor 243, respectively, to rotate adjacent stator 246 and generate an electric current in a known manner.

Generator drive belt 280, and the two pulleys 281, 282 are housed between a drive belt cover 279 and the upper generator housing member 267 which cooperate to form a transfer housing. Clutch-brake assembly 262 is directly connected to output shaft 220a via a rotatable input member, namely input tube 263, which also drives a driving pulley 281. A generator drive belt 280 connects the driving pulley 281 to a driven pulley 282 which then rotates a second rotatable member, namely generator drive shaft 283. It will be understood that although a timing belt system is shown, a standard belt and pulley system disposed in a similar transfer housing disposed above generator 261 and clutch-brake assembly 262 could be used in place of drive belt 280 and pulleys 281, 282.

Drive belt cover 279 also may include a plurality of mounting bosses 279a spaced appropriately to permit drive belt cover 279 and the entire generator clutch-brake assembly 260 to be mounted to the bottom of prime mover 220 or to the vehicle frame 210. Drive shaft 283 may be supported by upper bearing 284 located in drive belt cover 279 and lower bearing 285 in lower generator housing member 268.

Electric clutch-brake assembly 262 is used to selectively connect output hub 253 and pulley 254 to input tube 263. Input tube 263 also comprises clutch rotor 263a formed therewith. Output shaft 220a of prime mover 220 will also extend into the input tube 263 and is connected thereto by known means (not shown) to rotate therewith. Bearings, including upper bearing 264 in drive belt cover 279 and intermediate bearing 265 in upper generator housing member 267, are used to support input tube 263. A lower bearing 266 is located in output hub 253 to support rotation of output hub 253 and pulley 254 when the clutch is engaged.

As in the prior embodiment, a field coil 250 is used to activate the clutch function of the clutch-brake assembly 262, as seen in FIG. 5. Field coil 250 is fixed to an external surface 267b of the flange or extension 267a of upper generator housing member 267 to provide a compact arrangement. This arrangement reduces the overall height of the assembly 260, thereby conserving ground clearance in utility vehicles such as riding vehicle 200. Field coil 250 is powered by conductor 226 connected to controller 232. Braking force is applied to output hub 253 by means of clutch-brake disk 251, which is fixed to output hub 253 via leaf springs 252 and engages the inner surface of brake shroud 255 to provide the braking force. Leaf springs 252 bias the clutch-brake disk 251 to this braking position.

When field coil 250 is energized, clutch-brake disk 251 is magnetically pulled to engage clutch rotor 263a, thereby engaging the output hub 253 and pulley 254 with input tube 263 to provide rotational output thereto. It will be understood that upper generator housing member 267 is shaped appropriately to permit brake shroud 255 to be secured thereto by a plurality of gap adjustment mechanisms 272 similar to that previously described. Gap adjustment mechanisms 272 are used to control the spacing between clutch-brake disk 251 and clutch rotor 263a as needed.

Figure 6:
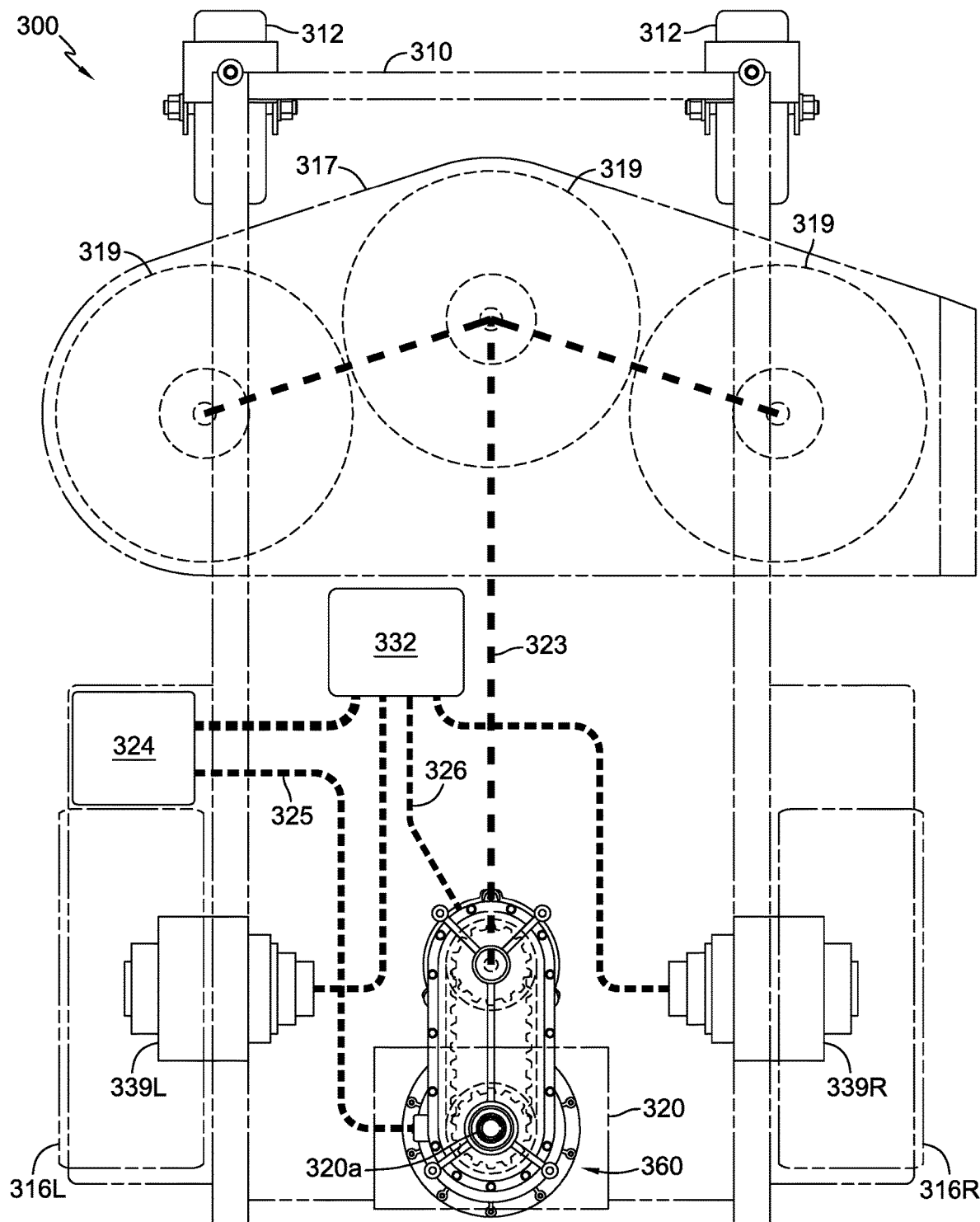
FIG. 6 is a partially schematic drawing of another exemplary vehicle incorporating an alternative embodiment of a combination electric generator and clutch assembly in accordance with the teachings herein.

A further embodiment of a combination electric clutch-brake and generator is shown in FIG. 6, which illustrates a riding vehicle 300 similar to that shown in FIG. 4 in many respects, and including a pair of electric wheel motors 339L, 339R to power a pair of driven wheels 316L, 316R. A set of caster wheels 312 is disposed at the front of frame 310, which also supports a mowing deck 317 having a plurality of mowing blades 319. Prime mover 320, which may be an internal combustion engine, is also disposed on frame 310 near the rear thereof. Vehicle 300 includes a standard belt and pulley system 323 that connects the output shaft 320a of prime mover 320 with mowing blades 319 via a clutch-brake assembly that is operatively similar to clutch-brake assembly 262. The primary difference between generator clutch-brake assembly 360 and the previously described generator clutch-brake assembly 260 is that the output shaft 320a is directly connected to and drives the generator side of generator clutch-brake assembly 360, permitting among other things a different orientation of generator clutch-brake assembly 360 with respect to vehicle frame 310. Certain modifications to the structure of the generator clutch-brake assembly would be required to permit this variation, as would be understood by one of skill in the art. Controller 332 is operatively connected to battery 324 and to wheel motors 339L, 339R, and also supplies power to electric generator clutch-brake assembly 360 via conductor 326, and the generator component is connected to battery 324 by means of conductor 325.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A generator and clutch assembly comprising:
    a generator disposed in a generator housing, the generator housing comprising an upper housing member and a lower housing member, the lower housing member having an external surface;
    a field coil mounted to the external surface;
    a brake shroud mounted to the external surface, wherein the brake shroud is adjustably mounted to the generator housing via a plurality of adjustment mechanisms, wherein each of the plurality of adjustment mechanisms separately comprises a wave spring disposed between the brake shroud and the external surface, wherein each of the plurality of adjustment mechanisms is separably operable to move the brake shroud relative to the external surface;
    a clutch rotor between the field coil and the brake shroud; and
    a clutch-brake disk between the clutch rotor and the brake shroud to selectively contact the clutch rotor when the field coil is energized and contact the brake shroud when the field coil is de-energized.

2. The generator and clutch assembly of claim 1, wherein each of the plurality of adjustment mechanisms separately further comprises a locknut disposed between the wave spring and the external surface, and a screw extending through the brake shroud, the wave spring and the locknut.

3. The generator and clutch assembly of claim 1, further comprising a pulley engaged to and drive by the clutch rotor.

4. The generator and clutch assembly of claim 1, further comprising an input tube extending through both the upper housing member and the lower housing member.

5. A generator and clutch assembly comprising:
    a generator disposed in a housing;
    a field coil fixed to an external surface of the housing;
    a brake shroud adjustably mounted to the housing via an adjustment mechanism, wherein the adjustment mechanism comprises a wave spring disposed between the brake shroud and the external surface, wherein the adjustment mechanism is operable to move the brake shroud relative to the external surface;
    a clutch rotor between the field coil and the brake shroud; and
    a clutch-brake disk between the clutch rotor and the brake shroud, the clutch-brake disk engaging the brake shroud when the field coil is de-energized and being magnetically attracted to engage the clutch rotor when the field coil is energized.

6. The generator and clutch assembly of claim 5, wherein the adjustment mechanism further comprises a locknut disposed between the wave spring and the external surface, and a screw extending through the brake shroud, the wave spring and the locknut.

7. The generator and clutch assembly of claim 5, wherein the housing comprises an upper housing member and a lower housing member, and the external surface to which the field coil is fixed is located on the lower housing member.

8. The generator and clutch assembly of claim 7, further comprising an input tube extending through both the upper housing member and the lower housing member.

9. A drive assembly for use with a prime mover having an output shaft, the drive assembly comprising:
    a housing comprising a plurality of housing members;
    a clutch-brake assembly supported by the housing and comprising:
        an input tube powered by the output shaft, wherein the input tube is directly engaged with the output shaft of the prime mover, wherein the input tube has a first axis;
        a brake shroud engaged to the housing;
        a field coil mounted to the housing;
        a clutch rotor connected to the input tube between the field coil and the brake shroud;
        a clutch-brake disk between the clutch rotor and the brake shroud to selectively engage the clutch rotor when the field coil is energized and to engage the brake shroud when the field coil is de-energized; and
        an output hub connected to the clutch-brake disk; and
    a generator assembly comprising a generator disposed in the housing and driven by a drive shaft drivingly engaged with the input tube, the drive shaft having a second axis that is parallel to and offset from the first axis.

10. The drive assembly of claim 9, wherein the plurality of housing members comprises a first housing member and a second housing member, and the first housing member forms an upper housing for the generator assembly, and the second housing member forms a lower housing for the generator assembly, and the brake shroud is engaged to the first housing member.

11. The drive assembly of claim 10, wherein the first housing member further comprises a flange, and the brake shroud is engaged to an external surface of the flange.

12. The drive assembly of claim 11, wherein the brake shroud is adjustably mounted to the external surface of the flange via at least one adjustment mechanism, the at least one adjustment mechanism operable to move the brake shroud relative to the external surface.

13. The drive assembly of claim 11, further comprising a cover engaged to the first housing member to form a transfer housing, and a transfer mechanism disposed in the transfer housing to transfer power from the input tube to the drive shaft of the generator.

14. The drive assembly of claim 13, wherein the transfer mechanism comprises a drive belt extending between a first pulley mounted on the input tube and a second pulley mounted on the drive shaft.

15. A drive assembly for use with a prime mover having an output shaft, the drive assembly comprising:
   a housing comprising a plurality of housing members, wherein the plurality of housing members comprises a first housing member and a second housing member, wherein the first housing member comprises a flange;
   a clutch-brake assembly supported by the housing and comprising:
      an input tube powered by the output shaft, the input tube having a first axis;
      a brake shroud engaged to an external surface of the flange of the first housing member of the housing, wherein the brake shroud is adjustably mounted to the external surface of the flange via a plurality of adjustment mechanisms, wherein each of the plurality of adjustment mechanisms is operable to move the brake shroud relative to the external surface, and wherein each of the plurality of adjustment mechanisms separately comprises a wave spring disposed between the brake shroud and the external surface;
      a field coil mounted to the housing;
      a clutch rotor connected to the input tube between the field coil and the brake shroud;
      a clutch-brake disk between the clutch rotor and the brake shroud to selectively engage the clutch rotor when the field coil is energized and to engage the brake shroud when the field coil is de-energized; and
      an output hub connected to the clutch-brake disk; and
   a generator assembly comprising a generator disposed in the housing and driven by a drive shaft drivingly engaged with the input tube, wherein the first housing member forms an upper housing for the generator assembly and the second housing member forms a lower housing for the generator assembly, wherein the drive shaft has a second axis that is parallel to and offset from the first axis.

16. The drive assembly of claim 15, wherein the input tube is directly engaged with the output shaft of the prime mover.

* * * * *